Dec. 20, 1949  C. TREE  2,491,940
UNIVERSAL MILLING HEAD

Filed Nov. 7, 1947  5 Sheets-Sheet 1

INVENTOR
CHARLES TREE

BY

ATTORNEYS

Dec. 20, 1949 C. TREE 2,491,940
UNIVERSAL MILLING HEAD
Filed Nov. 7, 1947 5 Sheets-Sheet 2

INVENTOR
CHARLES TREE

BY

ATTORNEYS

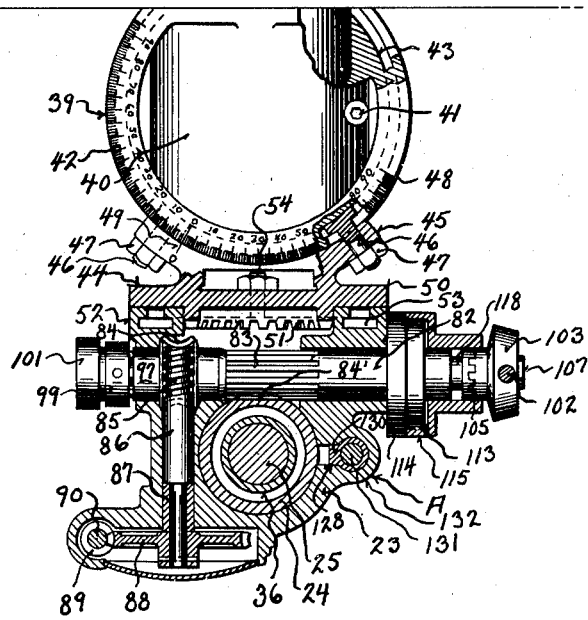

Dec. 20, 1949  C. TREE  2,491,940
UNIVERSAL MILLING HEAD
Filed Nov. 7, 1947  5 Sheets-Sheet 4
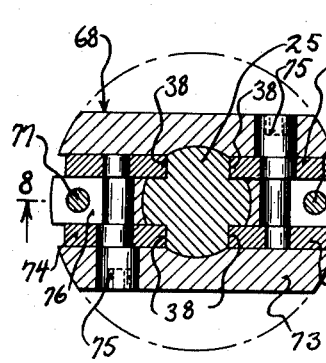
Fig.7.
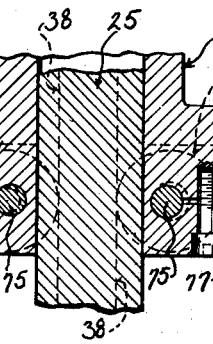
Fig.8.
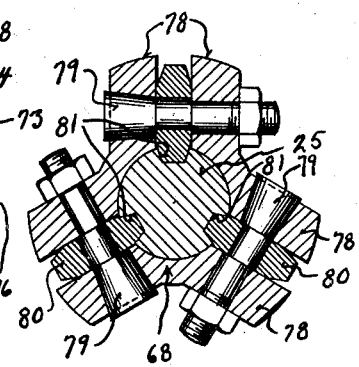
Fig.9.
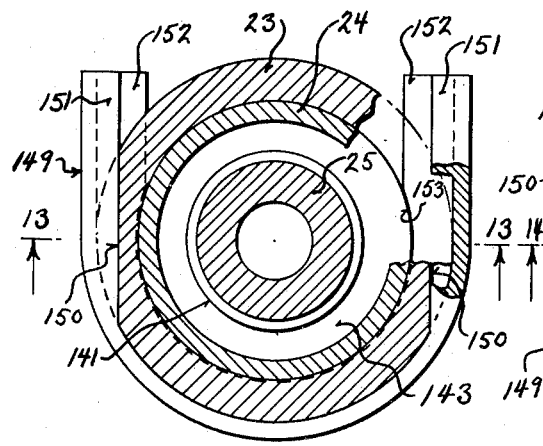
Fig.10.
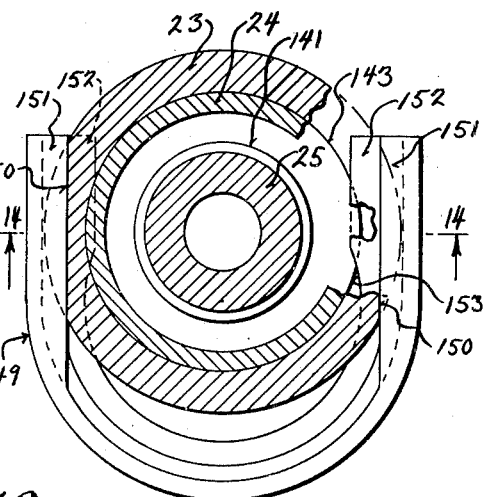
Fig.11.
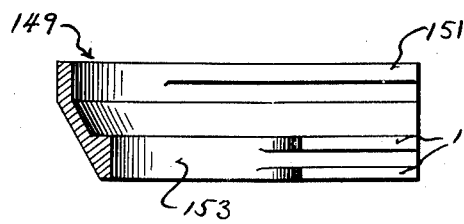
Fig.12.
INVENTOR
CHARLES TREE
BY 
ATTORNEYS Dec. 20, 1949 C. TREE 2,491,940
UNIVERSAL MILLING HEAD
Filed Nov. 7, 1947 5 Sheets-Sheet 5
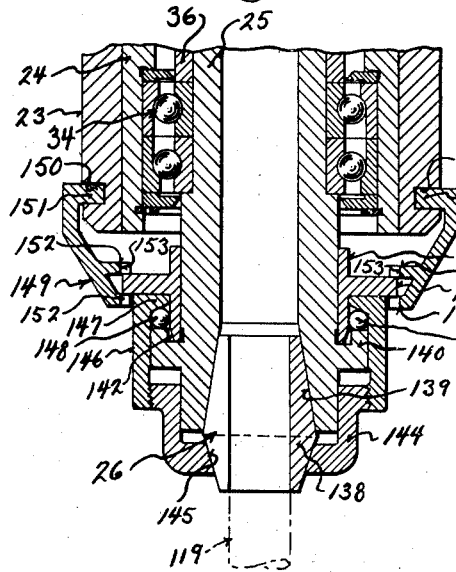
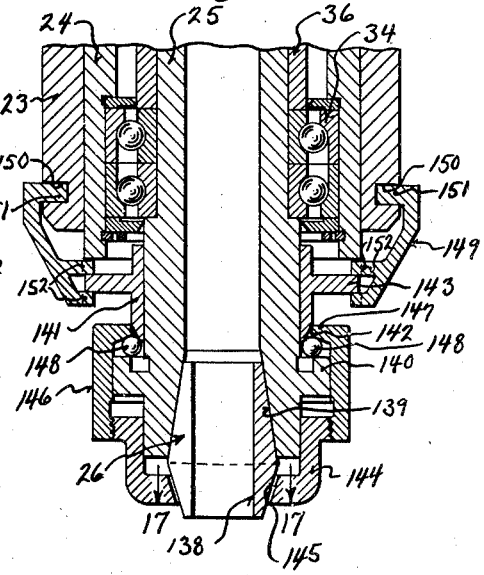
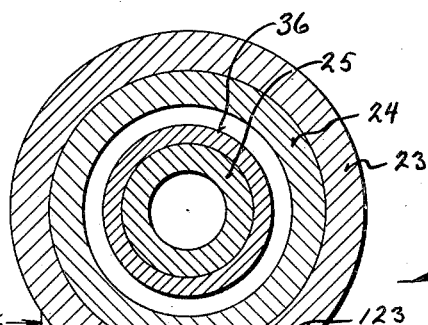
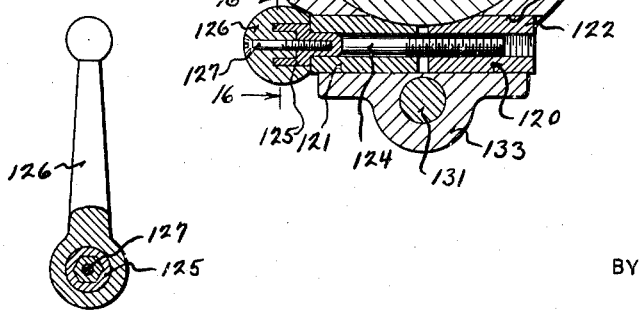
INVENTOR
CHARLES TREE
BY
ATTORNEYS Patented Dec. 20, 1949

2,491,940

UNITED STATES PATENT OFFICE 2,491,940

UNIVERSAL MILLING HEAD

Charles Tree, Racine, Wis.

Application November 7, 1947, Serial No. 784,660

9 Claims. (Cl. 90—17)

This invention appertains to metal working machines and more particularly to a novel milling head of a universal character.

One of the primary objects of my invention is to provide a novel vertical milling head attachment for use with a horizontal milling machine, which can be quickly and easily clamped in position on the overarm of the machine, whereby to readily convert the horizontal milling machine into a vertical milling machine.

Another salient object of my invention is to provide a novel vertical milling head attachment which can be readily swung to any desired adjusted angular position on the overarm, both around the horizontal axis of the arm and transversely to the horizontal axis of said arm.

A further object of my invention is to provide a vertical milling head attachment, which can also be effectively used as a drill press.

A further important object of my invention is to provide novel means for feeding the spindle to the work either by hand or from the drive motor for the spindle, novel means being provided for quickly disconnecting the power drive from the spindle when the same is being advanced by hand.

A still further object of my invention is to provide a novel adjustable micrometer stop or gauge for the spindle for setting the travel of the spindle to the exact desired point, means being provided for allowing slipping of the power drive when the stop is reached, said stop being mounted and closed on the head in a novel manner.

A still further object of my invention is to provide a novel collet for the tool or cutter with novel means for opening and closing the collet, whereby the desired cutters or tools can be quickly associated with or removed from the collet.

A still further important object of my invention is to provide novel guide rollers between the rotary drive head and the spindle with novel means for taking up wear or play between the head and the spindle.

With these and other objects in view, the invention consists in the novel construction. arrangement and formation of parts, as will be hereinafter more specifically described, and claimed, and illustrated in the accompanying drawings, in which drawings:

Figure 3 is a horizontal, sectional view through the head taken on the line 3—3 of Figure 2, looking in the direction of the arrows.

Figure 4 is an enlarged detail, vertical, sectional view through the head illustrating the means for advancing the quill and spindle by hand and the releasable clutch between the power drive and the quill, the view also illustrating the means for adjusting the head angularly on the overarm, the section being taken substantially on the line 4—4 of Figure 1 looking in the direction of the arrows.

Figure 5 is a detail, sectional view through the clutch taken on the line 5—5 of Figure 4 looking in the direction of the arrows.

Figure 7 is an enlarged, detail, horizontal, sectional view taken on the line 7—7 of Figure 2 looking in the direction of the arrows illustrating the guide rollers and the adjusting means therefor for operatively connecting the spindle with the rotary drive sleeve or head.

Figure 8 is an enlarged, fragmentary, detail, sectional view taken at right angles to Figure 7 and on the line 8—8 of Figure 7.

Figure 9 is a view similar to Figure 7 illustrating a modified form of roller drive between the driving sleeve and the spindle.

Figure 10 is an enlarged detail, horizontal, sectional view taken on the line 10—10 of Figure 2 looking in the direction of the arrows, illustrating the novel means employed for opening and closing the collet, the collet being shown in its closed, operative gripping position.

Figure 11 is a view similar to Figure 10 and showing the collet closer yoke shifted to a position for releasing the collet.

Figure 12 is a detail, vertical, central sectional view through the shifter yoke.

Figure 13 is a detail, sectional view through the lower end of the head, quill and spindle, the section being taken on the line 13—13 of Figure 10 and showing the collet in its clamping position.

Figure 14 is a view similar to Figure 13 but taken on the line 14—14 of Figure 11 looking in the direction of the arrows and showing the collet in its released position.

Figure 15 is an enlarged, fragmentary, detail, horizontal, sectional view taken on the line 15—15 of Figure 1 looking in the direction of the arrows and illustrating the means utilized for clamping the quill in a set adjusted position.

Figure 16 is a detail, sectional view through the adjusting crank and its connection for the locking means of the quill, the section being taken on the line 16—16 of Figure 1.

Figure 17 is a detail, horizontal, sectional view through the collet, the view being taken substantially on the line 17—17 of Figure 14, looking in the direction of the arrows.

Referring to the drawings in detail wherein similar reference characters designate corresponding parts throughout the several views, the letter A generally indicates my novel vertical universal milling head attachment for a horizontal milling machine M.

Figure 1:
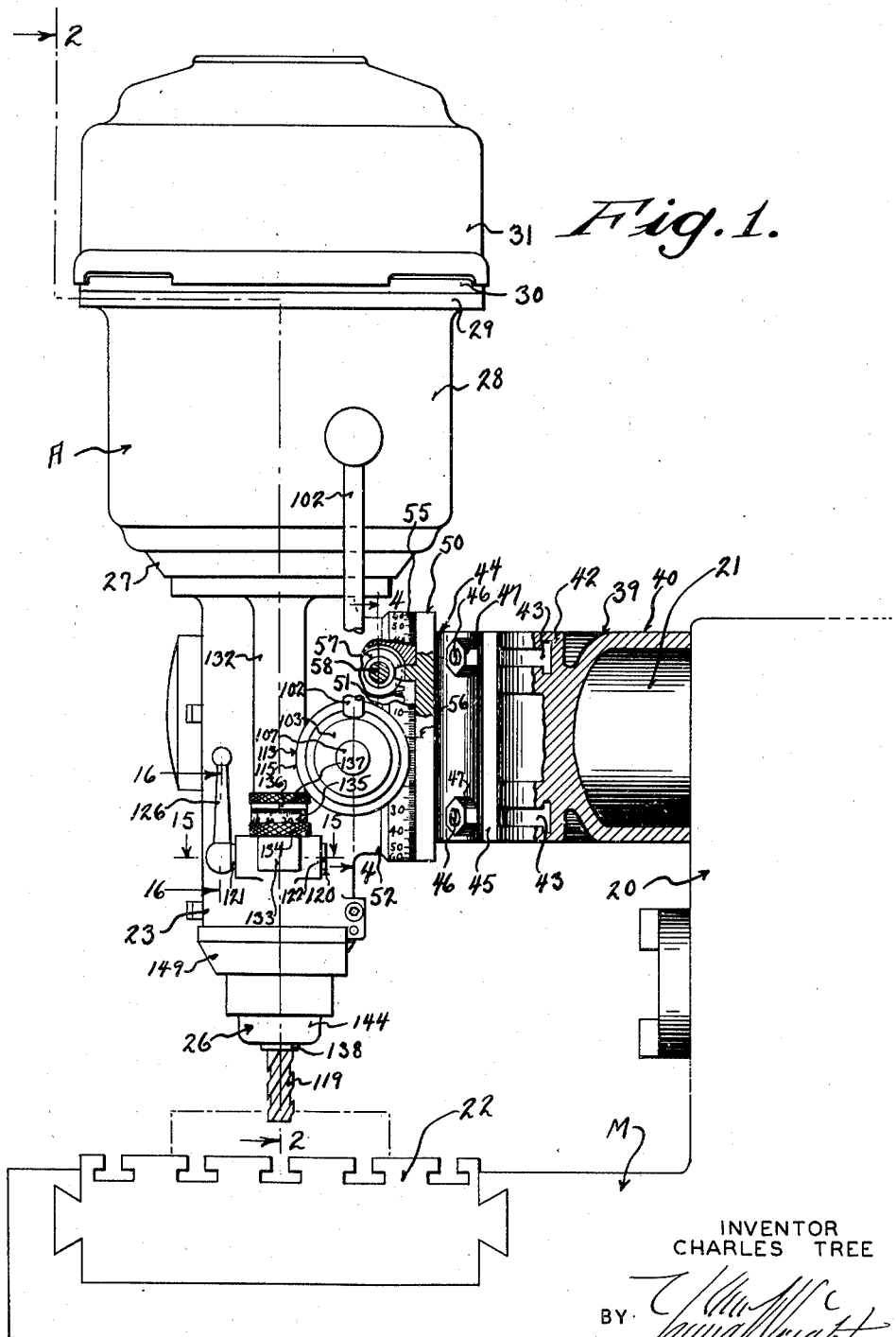
Figure 1 is a side elevational view of my novel vertical universal milling head showing the same attached to the overarm of a horizontal milling machine, parts of the attachment being shown broken away and in section.
Figure 2:
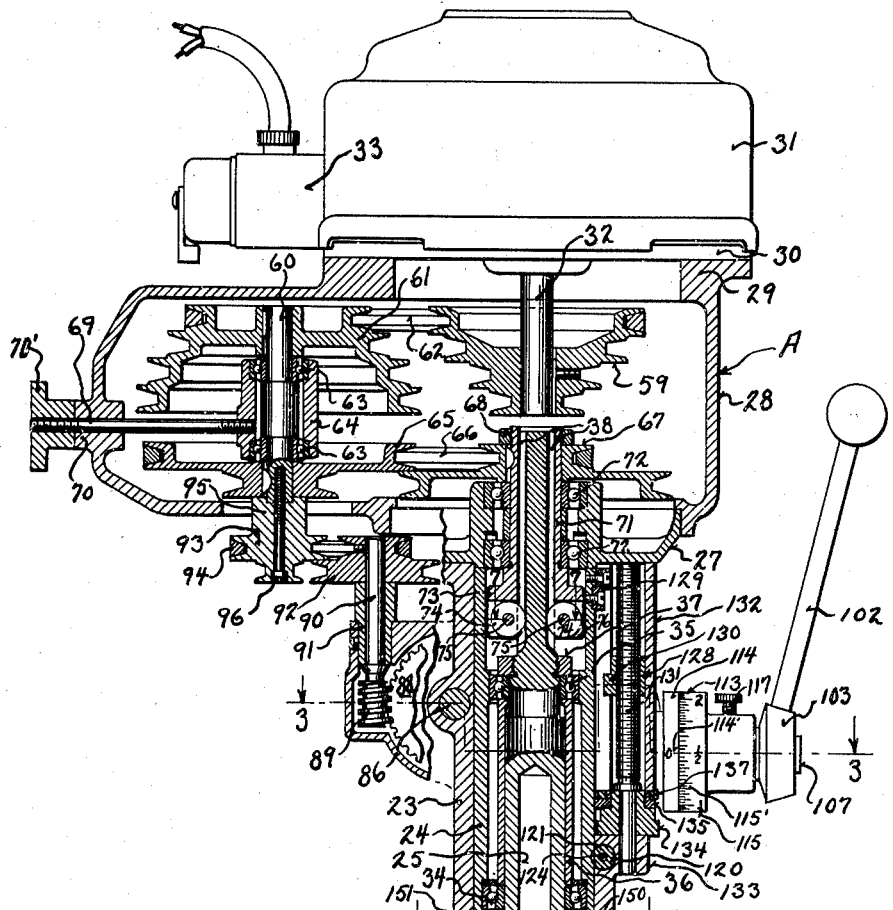
Figure 2 is a vertical, sectional view through the universal head taken on the line 2—2 of Figure 1, looking in the direction of the arrows.
Figure 6:
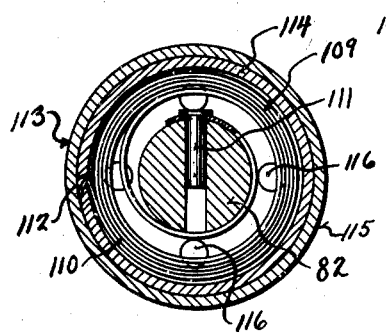
Figure 6 is a detail, sectional view taken on the line 6—6 of Figure 4 looking in the direction of the arrows illustrating the return spring for the quill and spindle.

The milling machine M is of the type now found in the open market and will not be described in detail, but the same includes a body 20 having an overarm 21 and a table 22 for the work. The work is adapted to be clamped to the table and the table can be of the type which can be reciprocated back and forth.

The milling head attachment A is adapted to convert the horizontal milling machine M into a vertical milling machine, and the head is supported in a novel fashion from the overarm 21.

As illustrated, the milling machine head attachment A comprises a vertical body 23 which can be of a general cylindrical form. The body has slidably mounted therein for reciprocatory movement, the milling head sleeve or quill 24 in which is rotatably mounted the spindle 25 to which is adapted to be clamped the cutter or other desired tools by a novel collet structure 26 which will be later described in detail. Secured to the upper end of the body 23 is a pulley housing support or casting 27 and fitted on this support and secured thereto is the pulley guard 28. The upper end thereof is provided with a flange or collar 29 to which is secured an adapter plate 30 for the drive electric motor 31. The motor 31 includes a depending armature shaft 32 and is provided with a control box 33. The motor can be of the reversible type and the control box 33 carries suitable switches for opening and closing the circuit to the motor and for controlling the direction of rotation of the motor.

The spindle 25 is provided with lower bearings 34 and upper bearings 35 and these bearings are separated by a bearing spacer sleeve 36. The upper and lower bearings serve to effectively rotatably support the spindle in the quill, and the quill and spindle reciprocate as a unit. A bearing nut 37 is threaded on the spindle for holding the bearings in place. Attention is also directed to the fact that the spindle above the nut 37 is provided with longitudinally extending guide grooves 38, the purpose of which will also be later set forth.

Referring to the mounting of the body 23 upon the overarm 21, I provide an adapter 39 which includes a sleeve 40 for snugly receiving the overarm. The sleeve can be turned axially around the arm, if such should be desired and can be clamped to the arm in an exact adjusted position by any suitable means such as a set screw 41. The adapter 39 is in the nature of a casting and also includes a front faceplate 42 which is a substantially cylindrical form when viewed in top plan. The outer face of the plate 42 is provided with upper and lower T-shaped guide grooves 43 and fitted against the plate 42 is a casting 44 having an arcuate saddleplate 45. This plate carries T-headed bolts 46, and the heads are received in the slots 43. Nuts 47 are threaded on the bolts 46 for holding the casting 44 in any preferred position around the plate 42, the upper surface of the plate 42 is provided with a graduated dial 48, and an indicating pointer or line 49 on the casting 44 cooperates with the graduated dial 48 to facilitate the setting of the casting 44. The casting 44 also includes, besides the saddle 45, a supporting disc 50, and this disc has formed concentrically on its outer face, a worm gear 51. Formed laterally on one side of the body 23 of the head is an annular enlargement 52 fitted against the disc 50 around the worm gear 51. This annular enlargement is provided with an annular concentric T-shaped groove 53 for receiving headed bolts 54 carried by the disc 50. The bolts 54 hold the disc tight against the annular enlargement 52 but permit said enlargement with the body 23 to turn on said disc for angular adjustment. To bring about the accurate angular adjustment, the annular enlargement 52 is provided with a graduated scale 55 and cooperating with the scale is a pointer or line 56 on the edge of the disc. A worm 57 is mounted upon a shaft 58 and is carried by the annular enlargement 52, and this worm meshes with the worm gear 51, so that by turning the shaft 58 and the worm 57, the annular enlargement 52 with the head 23 can be readily turned. One end of the shaft 58 protrudes beyond one side of the enlargement 52 and can be provided with a polygonal terminal for receiving a hand crank or wrench, not shown.

From the description so far, it can be seen that the head and its body 23 can be moved around the forward end of the overarm 21 to a desired set position and can then be swung about the horizontal axis of the overarm to any desired set angular position.

Novel means are provided for bringing about the power drive of the quill and spindle and for the manual operation of the quill and its spindle during the rotation of the spindle. The rotary drive for the spindle and the power and manual feed for the quill and spindle will now be described.

The armature shaft 32 of the motor 31 has keyed thereto a pulley 59. Arranged in spaced parallel relation to the armature shaft 32 is an idle pulley shaft 60, and this shaft has keyed thereto an idle pulley 61. A pulley belt 62 connects the pulleys 59 and 61 operatively together.

The pulleys 59 and 61 are of the speed change type, so that the belt can be shifted to a selected speed position. The idle pulley shaft 60 is supported by bearings 63 in a bearing collar 64, and this collar is slidably mounted within the pulley casing 28 by any desired means. Also keyed to the idle shaft 60 is a second idle pulley 65. This pulley has trained thereabout a drive pulley belt 66 which is, in turn, trained about a drive pulley 67 keyed or otherwise secured to a drive head 68. This head surrounds the upper end of the spindle 25 and has a novel driving connection with the spindle as will be later described. The idle shaft 60 can be adjusted in any preferred manner for tightening or loosening the belts 62 and 66 and as illustrated the bearing sleeve 64 has secured thereto an adjusting rod 69 which slidably extends through a boss 70 on the pulley case 28. Threaded on the rod 69 against the boss is an adjusting hand nut 70'. Obviously, by turning the hand nut, the rod and consequently, the bearing sleeve, can be moved out against the belts.

Referring to the driving connection between the drive head 68 and the spindle 25, it will be noted that the drive head 68 includes an elongated bearing sleeve 71 which extends through support 27 and axially into the quill 24. Bearings 72 rotatably support the bearing sleeve 71 in the support 27, and the lower end of the sleeve has formed thereon (see Figures 7 and 8) the head enlargement 73. This head enlargement 73 carries pairs of guide rollers 74 which are received within the guide grooves 38 in the spindle 25. This serves to allow reciprocation of the spindle in the drive head and at the same time sets up a driving connection between the rotary head and the spindle. Each pair of guide rollers 74 is rotatably mounted on an eccentric shaft 75 carried by the head enlargement 73. These shafts can be turned by a suitable wrench to adjust the rollers in and out toward and away from the spindle to compensate for wear or any slack between the driving head 68 and the spindle. If preferred, the driving head enlargement 73 can be provided with slots 76 which extend inwardly from the opposite sides of the head enlargement to the bores which receive the eccentric shafts 75. Adjusting machine screws 77 are threaded into the head enlargement through the slot 76 and by tightening these screws, the eccentric shafts 75 can be firmly gripped for holding the same in a set adjusted position.

In Figure 9, I have shown a slightly modified form of connection between the spindle 25 and the driving head 68. In this form of the invention, the lower end of the driving head is provided with a head enlargement which includes radially extending spaced pairs of ears 78 which can be arranged at thirds around the head. Each pair of ears receives an eccentric shaft or bolt 79. A guide roller 80 is rotatably mounted on the eccentric portion of each shaft or bolt. The rollers 80 ride in longitudinal guide grooves 81 formed in the spindle. The bolts or eccentric shafts are adjustable so that the rollers can be adjusted in and out toward and away from the axial center of the spindle.

Now referring to the feed of the quill 24 and the spindle 25 toward and away from the work, a pinion shaft 82 is rotatably carried by the body 23 at one side of the quill, and this shaft has formed thereon or secured thereto a pinion 83 which meshes with pinion rack teeth 84' formed on one side of the quill 24. Consequently, upon rotation of the pinion shaft 82, the quill and the spindle can be raised or lowered according to the direction of rotation of the pinion shaft. Loosely mounted on one end of the pinion shaft 82 is a worm gear 84, and this worm gear meshes with a worm 85 formed on or secured to a counter pinion shaft 86. The counter pinion shaft is rotatably mounted in a bearing sleeve 87 carried by a part of the body 23. The counter pinion shaft 86 in turn has keyed thereto a worm wheel 88, and this worm wheel meshes with a worm 89 formed on or secured to an upright drive pinion shaft 90. The pinion shaft 90 is rotatably mounted in a suitable bearing 91 carried by part of the body 23. Secured to the extreme upper end of the drive pinion shaft 90 is a pulley 92 and connected with the idle pulley shaft 60 is a drive feed pulley 93. A pulley belt 94 operatively connects the drive feed pulley 93 with the pulley 92. The drive feed pulley 93 has a hub 95 which is normaly pressed against the shaft 60 and the pulley 65 by a bolt 96 which extends axially through the hub.

I also provide means for connecting and disconnecting the worm wheel 84 with the pinion shaft 82. As inferred, the worm wheel 84 is normally rotatably mounted upon the pinion shaft and its hub can be pressed into driving engagement with a shoulder on the pinion shaft 82 and connected with the pinion shaft 82 by a clutch section 97 feathered on said pinion shaft. The clutch section 97 has formed on one end a tapered face which is adapted to frictionally engage the walls of a socket 98 formed in the worm wheel 84. Secured to the pinion shaft is a collar 99 slidably carrying pusher pins 100. Threaded on the shaft 82 is a hand nut 101, and by threading the hand nut 101 inward, the pins 100 will force the clutch section 97 into driving engagement with the walls of the socket 98, thus bringing about the power drive of the shaft 82 and the power feeding of the quill and the spindle.

Means are provided for manually turning the shaft 82 to feed the quill and spindle downward, such as when the device is being used similar to a drill press. When the device is being hand fed, the nut 101 is turned outward, so as to relieve the pressure of the pins 100 against the clutch section 98. This manual feed means includes a hand lever 102 carried by a hub 103. This hub is rotatably mounted on a tubular extension 104 on the pinion shaft 82. The hub 103 and the pinion shaft are provided with mating clutch teeth 105, and the hub is normally urged inward into operative driving engagement with the pinion shaft by a spring pressed plunger 106. This plunger has connected with its outer end a disc 107 which bears against the hub. An expansion spring 108 is connected with the inner end of the plunger and its outer end bears against a part of the pinion shaft. By pulling the handle 102 and the hub 103 outward, drive between the handle and the pinion shaft can be disconnected. This will allow the handle to be ratcheted back and forth.

A spring return is provided for the pinion shaft 82 so that after the quill and the spindle is fed down, the return will automatically rotate the pinion shaft 82 in a retrograde direction and raise the quill and the spindle. The spring return is generally indicated by the reference character 109 and includes the coil spring 110 wound about the shaft 82. One end of the spring is anchored by a pin 111 to the shaft, and the opposite end of the spring is secured as at 112 to the spring return case 113. The case 113 includes an inner section 114 and a removable outer section 115. Pins 116 are utilized for connecting the inner section 114 of the case to the body 23. The other section of the case is held against displacement by a screw 117. The screw is carried by the section 115 and is received in an annular groove 118 formed in the pinion shaft 82.

After the section 115 is slipped on the pinion shaft 82, the screw 117 is tightened so as to hold the case section 115 in place. The outer surface of the section 115 is provided with a graduated scale 115', and a pointer or zero line 116' cooperates with the graduated scale to indicate to the operator the downward distance of movement of the spindle.

From the description so far, it can be seen that a tool such as a milling cutter 119 is connected by the collet structure 26 with the spindle 25, and the body 23 is adjusted to the desired position on the overarm 21 and on the casting 39 and the casting 44. The motor 31 is run in the desired direction, and the spindle can either be fed down by the hand lever 102 or by the power feed. If the power feed is being used, the nut 101 is tightened on the shaft 82, and the spindle is raised by disengaging the clutch and using the hand feed lever 102.

Where pieces are being milled and reciprocated past the cutter by the table 22, the quill 24 and the spindle 25 can be held in an adjusted position by means of a lock 120 (see Figure 15). This lock 120 includes a pair of friction blocks 121 and 122 slidably mounted in a way 123 formed in the body 23. This way opens into the body, and the blocks are adapted to extend into the body for binding contact with the quill 24. Rotatably mounted in the block 121 is an adjusted screw 124, and this screw is threaded into the block 122. The outer end of the screw is provided with a head 125 having an internal polygonal socket. A manipulating handle 126 is fitted on said head and has a polygonal portion extending into the socket. A screw 127 passes through the handle into the adjusting screw 124 for holding the handle against displacement. Obviously, by tightening up the adjusting screw, the blocks 121 and 122 can be brought into binding contact with the quill 24.

In conjunction with the downward feed of the quill 24 and the spindle 25, I provide an adjustable micrometer stop mechanism 128. This mechanism includes a stop block 129 rigidly fastened to the quill 24 for traveling movement therewith, and this stop is adapted to engage a stop 130 carried by the body 23 and disposed in the path of the travel of the stop 129. The stop 130 is in the nature of a traveling nut, and its threaded bore receives the micrometer feed screw 131. The micrometer feed screw 131 is mounted in a part of a housing 132 carried by the body 23, and the adjustable stop 130 is held against rotation by its engagement with said housing. The lower end of the screw is rotatably mounted in a suitable bearing 133 formed on said body 23.

Keyed or otherwise secured to the feed screw is a knurled finger knob 134 for turning the screw to position the stop 130 at the desired point. The knob 134 has loosely mounted thereon a lock washer 135, and this washer engages a part of the body 23 so as to prevent the rotation thereof with the knob 134. The knob 134 and the lock washer 135 are provided with cooperating scale and pointer 136 so that the operator can determine the position of the stop 134 to regulate the downward feed of the spindle. After the screw 131 has been rotated by the knob to position the stop 130 at the desired point, the micrometer screw and knob are locked against further movement so that the same cannot be accidentally turned. This lock consists of a threaded knurled ring 137 mounted on the lock washer 135. By threading down the ring 137 tight against the washer, the lock washer can be jammed against the knob so as to hold the knob, and consequently, the screw against accidental turning movement.

The novel collet mechanism for holding the cutter or other tool includes a split collet 138, and the opposite ends of the collet are tapered in opposite directions. The tapered upper end of the collet is fitted in the tapered socket 139 in the lower end of the spindle 25 (see Figures 13 and 14). The spindle has formed thereon adjacent to its lower end an annular grooved flange 140. Slidably mounted upon the spindle is a shifter sleeve 141, and this shifter sleeve has its lower end provided with a tapered bearing face 142. The shifter sleeve is also provided with an outstanding annular rib 143, the purpose of which will later appear. Slidably mounted upon the lower end of the spindle below the flange 140 is the collet closer nose 144, and the inner periphery of this nose is tapered as at 145 for engagement with the tapered lower outer end of the collet. The nose has threaded thereon a collar 146, and this collar is slidable upon the flange 140 and has formed on its upper end the inwardly directed retaining flange 147. Collet closer balls 148 are received between the flanges 140 of the spindle end 147 and the collar 146 and are movable by the shifter sleeve 141.

Laterally slidable upon the body 23 is a shifter yoke 149. The body is grooved on its opposite sides to provide guideways 150. The yoke 149 has formed on its upper edges guide ribs 151 which are received in the guideways. The lower part of the yoke (see Figures 10, 11 and 12) is provided with holding flanges 152 for the shifter sleeve, and these flanges 152 fade away into a substantially circular portion 153 formed in said yoke. When the shifter yoke is pushed inwardly (see Figures 10 and 13), the circular portion 153 aligns with the flange 143 of the shifter collar 141, so that the shifter collar will have free movement with the spindle 25. In this position, the tool is firmly clamped by the collet 139. When it is desired to release the collet, the spindle is raised to its extreme position, by operating the hand feed lever to move the quill, so that the flange 143 of the shifter sleeve 141 will be in horizontal alignment with the holding flanges 152 on the yoke 149. At this time, the yoke is pulled outwardly (see Figures 11 and 14), so that the flange 143 will be positioned between said holding flanges 152. The spindle is now fed downward a slight distance by operating the hand feed lever to move the quill, and the shifter sleeve 141 will be held in a raised position, and the lower tapered end 142 thereof will ride out of the grooved flange 140 of the spindle allowing the shifter balls 148 to move inwardly toward the longitudinal axis of the spindle a slight distance. This allows the nose 144 and its collar 146 sufficient longitudinal play on the spindle, so that the nose can be pulled down away from the collet 139. The tool can now be pulled out of the collet. When the tool is to be locked into the collet, the same is inserted in the collet in the ordinary way, and the spindle is moved upwardly by operating the hand feed lever to move the quill (Figure 14), and as the shifter sleeve 141 is held against movement, the lower tapered end 142 thereof will force the balls 148 outward which will force up the collar 146 and the nose 144. The tapered face 145 of the nose riding against the lower tapered end of the collet will effectively close the collet and grip the tool.

In use of my device, the stop 130 is set to the desired position as heretofore described, and the machine is set in operation as also described. Upon downward movement of the quill, the stop 129 carried thereby will engage the stop 130 and limit further downward movement of the quill and the feeding of the tool. The driving connection between the quill and the motor is such that the belt 94 will slip. The operator can then raise the quill by operating the hand feed lever.

From the foregoing description, it can be seen that I have provided a vertical milling head attachment for a horizontal milling machine which can be quickly and instantly adjusted to different angular positions and which can be successfully used as a drill press.

While I have shown my novel milling head utilized particularly with a horizontal milling machine, it is to be understood that the use of the head is not limited to such machines. The head can be used in conjunction with other machines or as an independent unit on a drill press standard or the like.

Changes in details may be made without departing from the spirit or the scope of my invention, but what I claim as new is:

1. A universal milling machine head comprising a body, a quill longitudinally movable in said body, a spindle for a tool rotatably mounted in the spindle and movable longitudinally therewith, a pinion shaft rotatably carried by the body, rack teeth on the quill operatively engaging the pinion shaft, a motor for rotating the spindle, means including a clutch for rotating the shaft from the motor, a hand feed lever rotatable on the shaft, means for clutching the hand feed lever to the shaft, a return spring for said shaft coiled about said shaft, a housing for said return spring including an inner section and an outer section rotatable on the inner section, means securing the inner section to the body, means anchoring one end of the spring to the shaft, means anchoring the opposite end of the spring to the inner section of the housing, means releasably securing the outer section of the housing to the shaft, and cooperating indicating pointer and scale on the inner and outer sections.

2. A universal milling head attachment comprising a body, a quill longitudinally slidable in said body, a spindle for a tool slidable with the quill and rotatably mounted therein, a feed shaft for the quill having a pinion, a rack bar on the quill meshing with the pinion, means for manually rotating the shaft, means for indicating the amount of movement of the quill, a motor for rotating the spindle, means for power feeding the quill including a worm wheel loosely mounted on the shaft, means for rotating the worm wheel from the motor, a sliding clutch section feathered to said shaft for frictional binding contact with the hub of the pinion, a collar secured to said shaft, pusher pins slidably carried by the collar for the clutch section, and a nut threaded on said shaft for bearing engagement against said pins.

3. A universal milling head attachment comprising a body, a quill slidably mounted in said body, means for advancing and retracting the quill, a spindle for a tool slidable with the quill and rotatably mounted therein, said spindle extending above the quill and provided with longitudinal guide grooves, a drive head rotatably carried by the body receiving the spindle, a motor for rotating said drive head, and guide rollers carried by the drive head received in said guide grooves.

4. A universal milling head attachment comprising a body, a quill slidably mounted in said body, means for advancing and retracting the quill, a spindle for a tool slidable with the quill and rotatably mounted therein, said spindle extending above the quill and provided with longitudinal guide grooves, a drive head rotatably carried by the body receiving the spindle, a motor for rotating said drive head, guide rollers carried by the drive head received in said guide grooves, and means for adjusting the rollers into and out of said guide grooves for taking up play.

5. A universal milling head attachment comprising a body, a quill slidably mounted in said body, means for advancing and retracting the quill, a spindle for a tool slidable with the quill and rotatably mounted therein, said spindle extending above the quill and provided with longitudinal guide grooves, a drive head rotatably carried by the body receiving the spindle, a motor for rotating said drive head, guide rollers carried by the drive head received in said guide grooves, means for adjusting the rollers into and out of said guide grooves for taking up play, said adjusting means including eccentric shafts on which the rollers are mounted, and means for turning said shafts.

6. A universal milling attachment comprising a body, a quill slidably mounted in said body, means for sliding the quill in the body, a spindle for a tool slidable with the quill and rotatable therein, means for rotating the spindle, a stop on said quill movable therewith, means for setting the distance of feed of the quill and spindle including a housing on the body, a micrometer screw rotatably mounted in said housing, a stop nut on the screw held against rotation by the housing, and a knob for rotating the screw for raising and lowering the stop nut, said stop nut being disposed in the path of travel of the stop on the quill.

7. A universal milling attachment comprising a body, a quill slidably mounted in said body, means for sliding the quill in the body, a spindle for a tool slidable with the quill and rotatable therein, means for rotating the spindle, a stop on said quill movable therewith, means for setting the distance of feed of the quill and spindle including a housing on the body, a micrometer screw rotatably mounted in the housing, a stop nut on the screw held against rotation by the housing, a knob for rotating the screw for raising and lowering the stop nut, said stop nut being disposed in the path of travel of the stop on the quill, a lock washer mounted on the knob held against rotation by the housing, a graduated dial on the knob, an indicating line on the washer for cooperating with the graduations of the scale, and a jam nut threaded on the knob for movement into and out of locking engagement with the washer.

8. A universal milling head attachment comprising a body, a quill movable longitudinally in said body, a spindle for a tool slidable with the quill and rotatably mounted therein, means for driving the spindle, means for advancing and retracting the quill in the body, the lower end of the spindle having a tapered socket, a split collet having a tapered upper end received in said socket, said collet having a tapered lower end also, a collet closing nose having a tapered opening receiving the tapered lower end of the collet slidably mounted on the spindle, a collar slidable with the nose having a retaining flange on its upper end, said spindle having a grooved retaining flange, pusher balls confined between said flanges, a shifter sleeve slidably mounted on the spindle and movable toward and away from said balls, and a shifter saddle slidably mounted on the body movable into and out of engagement with the shifter sleeve for holding said sleeve against movement for release of the nose, said nose being released by moving the quill down.

9. The combination with a horizontal milling machine including an overarm, of a vertical milling machine head including a body, a quill and spindle slidably carried by said body, an adapter sleeve receiving said overarm, said sleeve being provided with a substantially cylindrical collar having its axis at right angles to the axis of the sleeve, guideways formed around said collar, a supporting disc, a saddleblock on said disc engaging the outer face of the collar, means carried by said saddleblock mounted in the guideways in the collar, means for holding the saddleblock in an adjusted position at a selected point around said collar, an extension on said body fitted against said disc, means rotatably mounting the extension on the disc, and cooperative means between the extension and disc for turning said body on the disc to a selected adjusted position.

CHARLES TREE.

REFERENCES CITED

The following references are of record in the file of this patent:

UNITED STATES PATENTS

| Number | Name | Date |
|---|---|---|
| 1,971,299 | Fickett et al. | Aug. 21, 1934 |
| 2,178,130 | Zwick | Oct. 31, 1939 |
| 2,267,336 | Kindelberger | Dec. 23, 1941 |
| 2,289,912 | Hirsch | July 14, 1942 |
| 2,296,573 | Richards | Sept. 22, 1942 |
| 2,404,561 | Bannow | July 23, 1946 |